United States Patent
Park

(10) Patent No.: US 10,159,082 B1
(45) Date of Patent: Dec. 18, 2018

(54) DATA COMMUNICATIONS OVER A DISTRIBUTED MULTI-CORE LONG TERM EVOLUTION (LTE) NETWORK

(71) Applicant: Sprint Communications Company L.P., Overland Park, KS (US)

(72) Inventor: Sunyong Park, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 152 days.

(21) Appl. No.: 15/198,265

(22) Filed: Jun. 30, 2016

(51) Int. Cl.
*H04W 72/04* (2009.01)
*H04L 5/00* (2006.01)
*H04W 72/00* (2009.01)
*H04W 60/04* (2009.01)

(52) U.S. Cl.
CPC ......... *H04W 72/048* (2013.01); *H04L 5/0069* (2013.01); *H04W 60/04* (2013.01); *H04W 72/005* (2013.01)

(58) Field of Classification Search
None
See application file for complete search history.

(56) References Cited

U.S. PATENT DOCUMENTS

| | | | |
|---|---|---|---|
| 6,876,649 B1 | 4/2005 | Beshai | |
| 9,001,682 B2 | 4/2015 | Kovvali et al. | |
| 9,326,229 B2 | 4/2016 | Yokota | |
| 2006/0190605 A1* | 8/2006 | Franz | G06Q 10/0631 709/226 |
| 2011/0176530 A1 | 7/2011 | Vikberg et al. | |
| 2013/0051298 A1* | 2/2013 | Drevo | H04W 36/0083 370/312 |
| 2013/0225123 A1* | 8/2013 | Adjakple | H04W 4/24 455/406 |
| 2015/0063296 A1 | 3/2015 | Noma et al. | |
| 2016/0007331 A1 | 1/2016 | Gauba et al. | |
| 2016/0262045 A1* | 9/2016 | Yang | H04W 28/0289 |
| 2016/0285935 A1* | 9/2016 | Wu | H04L 65/4076 |
| 2017/0251357 A1* | 8/2017 | Iwai | H04W 8/08 |
| 2018/0077668 A1* | 3/2018 | Chun | H04W 4/046 |

FOREIGN PATENT DOCUMENTS

WO  WO-2017043940 A1 *  3/2017  .............. H04W 4/06

* cited by examiner

*Primary Examiner* — Redentor Pasia
*Assistant Examiner* — Peter K Mak

(57) ABSTRACT

A distributed multi-core Long Term Evolution (LTE) data communication network serves User Equipment (UE) with various combinations of data services. A wireless base station receives core service data that individually associates the data services with the LTE network cores. The wireless base station transfers UE service data that indicates the data services to the UE. The wireless base station receives a UE service request from the UE identifying one of the data services and responsively selects an LTE network core based on the core service data. The wireless base station transfers a UE message that indicates the UE and the identified data service for delivery to the selected LTE network core. The selected LTE network core serves the identified data service to the UE.

14 Claims, 6 Drawing Sheets

DATA COMMUNICATIONS OVER A DISTRIBUTED MULTI-CORE LONG TERM EVOLUTION (LTE) NETWORK

TECHNICAL BACKGROUND

Data communication systems exchange user data with User Equipment (UEs) to provide various data communication services. The UEs may be phones, computers, media players, and the like. The data communication services may be Internet access, voice/video calling, messaging, evolved Multimedia Broadcast Multicast Service (eMBMS), location-based services, local bulletin (news/traffic/weather), vehicle services (V2X), group communications, enterprise access, or some other computerized information services.

A popular wireless communication technology is Long Term Evolution (LTE). LTE networks use wireless base stations called evolved Node Bs (eNodeBs) to connect the UEs to LTE network cores. The LTE network cores comprise network elements like mobility managers, gateways, controllers, routers, databases, and servers. The LTE network cores exchange user data with the user devices over the eNodeBs to serve out the various data services.

The UEs are typically attached to the proximate LTE network core. The UEs typically switch from one LTE network core to another when they transit large distances. In some examples, a special UE ID may be used to identify and attach a special UE to a special LTE network core that provides a special data service. These special LTE network cores are not readily scalable in an open system. Unfortunately, wireless base stations do not yet efficiently and effectively attach UEs to LTE network cores in a complex multi-service, multi-core LTE environment.

TECHNICAL OVERVIEW

A distributed multi-core Long Term Evolution (LTE) data communication network serves User Equipment (UE) with various combinations of data services. A wireless base station receives core service data that individually associates the data services with the LTE network cores. The wireless base station transfers UE service data that indicates the data services to the UE. The wireless base station receives a UE service request from the UE identifying one of the data services and responsively selects an LTE network core based on the core service data. The wireless base station transfers a UE message that indicates the UE and the identified data service for delivery to the selected LTE network core. The selected LTE network core serves the identified data service to the UE.

DETAILED DESCRIPTION

Figure 1:
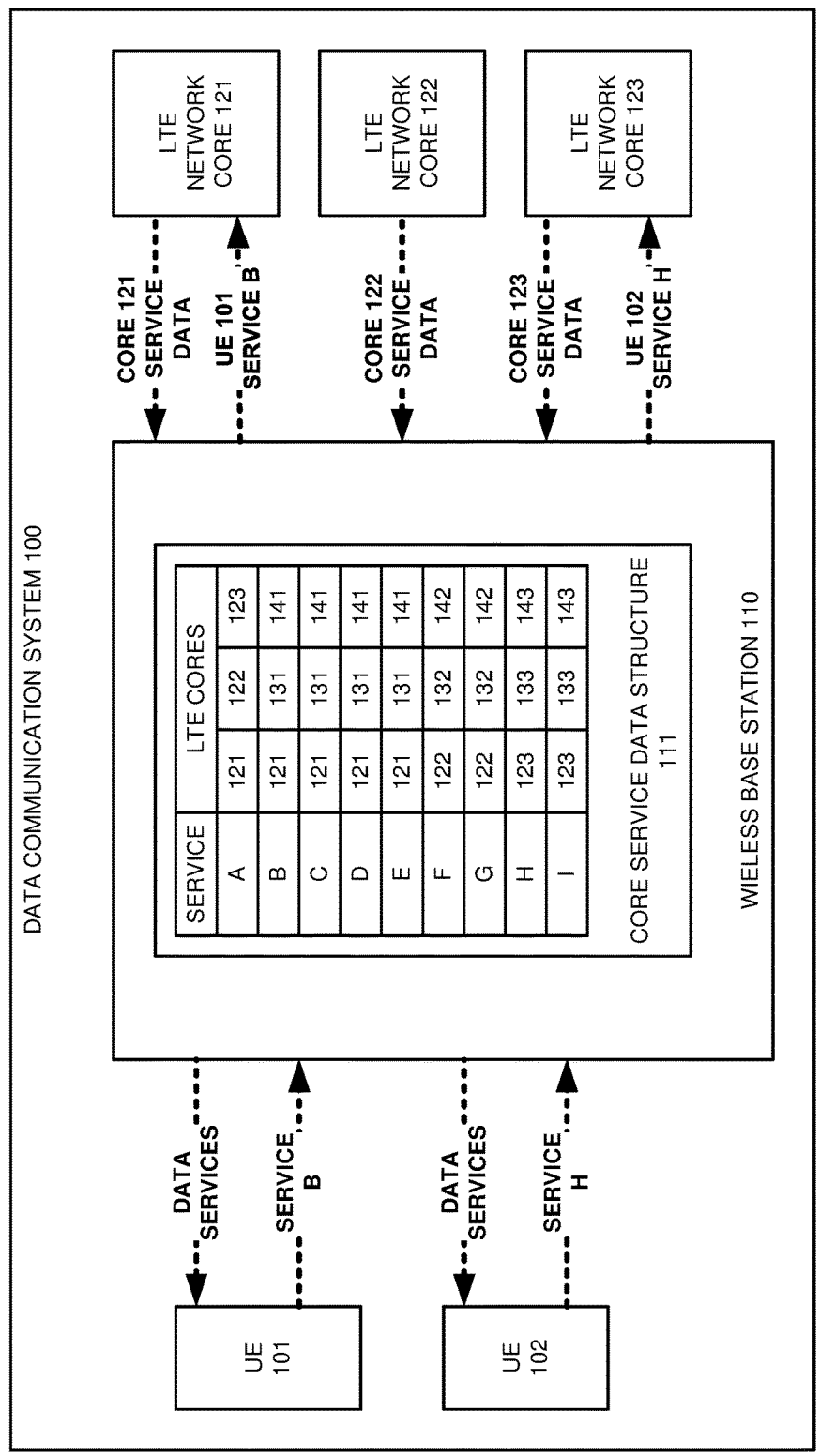
FIG. 1 illustrates a data communication system to attach User Equipment (UEs) to a distributed multi-core Long Term Evolution (LTE) network.

FIG. 1 illustrates data communication system 100 to attach User Equipment (UEs) 101-102 to a distributed multi-core Long Term Evolution (LTE) network. Data communication system 100 comprises UEs 101-102, wireless base station 110, and LTE network cores 121-123. Data communication system 100 exchanges user data with UEs 101-102 to support data communication services like Internet access, voice/video calling, messaging, evolved Multimedia Broadcast Multicast Service (eMBMS), location-based services, local bulletin (news/traffic/weather), vehicle services (V2X), group communications, enterprise access, or some other computerized information services.

UEs 101-102 could be computers, phones, media players, or some other intelligent machines. Wireless base station 110 could be an evolved Node B (eNodeB), Wireless Fidelity (WIFI) hotspot, LTE relay, 5G base station, or some other wireless access point. LTE network cores 121-123 comprise communication network elements like gateways, controllers, routers, databases, and servers. The elements of data communication system 100 (101-102, 110, 121-123) each comprise data processing circuitry, data memory, data communication transceivers, and operating software.

In operation, LTE core networks 121-123 transfer core service data to wireless base station 110 to identify the data services for each network core. The core service data may be organized into bit strings (CORE121:110010101 . . . ) to efficiently identify the status of data services at the core by the one or zero and its placement in the string. The core service data may also indicate a class or type of core, such as enterprise, V2X, full service, and the like.

Wireless base station 110 aggregates and correlates the received data into core service data structure 111 that individually associates representative data services A-I with LTE network cores 121-123. LTE core 121 is associated with individual data services A, B, and C, D, and E. LTE core 122 is associated with individual data services A, F, and G. LTE core 122 is associated with individual data services A, H, and I.

Upon attachment or UE request, wireless base station 110 transfers UE service data to UEs 101-102 indicating available data services A-I that are indicated in data structure 111. The transfer may occur over Access Stratum (AS) information blocks or Non-Access Stratum (NAS) data files. For example, upon initial attachment to a default core, wireless base station 110 may transfer the UE service data to UE 101 for subsequent service requests. The UE service data may also use bit strings to efficiently identify the UE data services that are available over wireless base station 110.

Some UEs may not be authorized for all data services. UEs 101-102 are typically subscribed to individual data services, so LTE network cores 121-123 should have the appropriate UE context for UE service authorizations. Consider an example where wireless base station 110 receives a UE service request for data service B from UE 101. The UE service request may be Radio Resource Connect (RRC) message with a Service Feature Indicator (SFI) that indicates the data service B. The UE service request may have an indicator bit that identifies the presence of SFI in the request, and may also use a bit strings to efficiently identify the requested data service. Note that the RRC Connect message also includes the standard Establishment Cause in addition to the SFI.

Wireless base station 110 enters core service data structure 111 with data service B which yields LTE network cores 121, 131, and 141. Wireless base station 110 selects LTE network core 121 over cores 131 and 141 based on factors like proximity, loading, UE ID, quality-of-service, or some other metric. In response to the selection of LTE network core 121, wireless base station 110 transfers a UE message that indicates UE 101 and data service B to selected LTE network core 121. The UE message may be an S1-MME Initial UE message, and wireless base station 110 could transfer the S1-MME Initial UE message to an LTE Mobility Management Entity (MME) in LTE network core 121.

Consider another example where wireless base station 110 receives a UE service request for data service H from UE 102. The UE service request may be an RRC message with the standard Establishment Cause plus an SFI bit string that indicates data service H. Wireless base station 110 enters core service data structure 111 with data service H which yields LTE network cores 123, 133, and 143. Wireless base station 110 selects LTE network core 123 over cores 133 and 143 based on factors like proximity, loading, UE ID, quality-of-service, or some other attribute. In response to the selection of LTE network core 123, wireless base station 110 transfers a UE message that indicates UE 101 and data service H to selected LTE network core 123. The UE message may be an S1-MME Initial UE message to an MME in LTE network core 123.

LTE network cores vary. Some LTE cores may have multiple MMEs that share a Serving Gateway (S-GW) and a Packet Data Network Gateway (P-GW). Other cores may have multiple MMEs and S-GWs share a P-GW. Some LTE cores have direct access to a Home Subscriber System (HSS) and/or Policy Charging Rules Function (PCRF) while other cores have indirect access through another core. Most cores have direct Internet access although some cores have indirect Internet access through another core. LTE network cores 121-123 may include various combinations of V2X servers, eMBMS servers, group communication servers, enterprise servers, and the like.

In some examples, LTE network cores 121-123 comprise Network Function Virtualization Infrastructures (NFVIs) that execute Network Function Virtualization (NFV) Virtual Network Functions (VNFs). These NFV VNFs may comprise Software-Defined Network (SDN) applications and controllers. In turn, the NFV VNFs and SDN applications may comprise base station controllers, MMEs, S-GWs, P-GWs, HSS, PCRF, V2X servers, eMBMS servers, group communication servers, local bulletin servers, and enterprise servers. In these examples, data structure 111 can be expanded to individually associate the data services with NFVIs, NFV Network Service Descriptors (NSDs), VNF Forwarding Graphs (VNFFGs), and/or SDN applications that are also individually associated with one or more LTE network cores.

Figure 2:
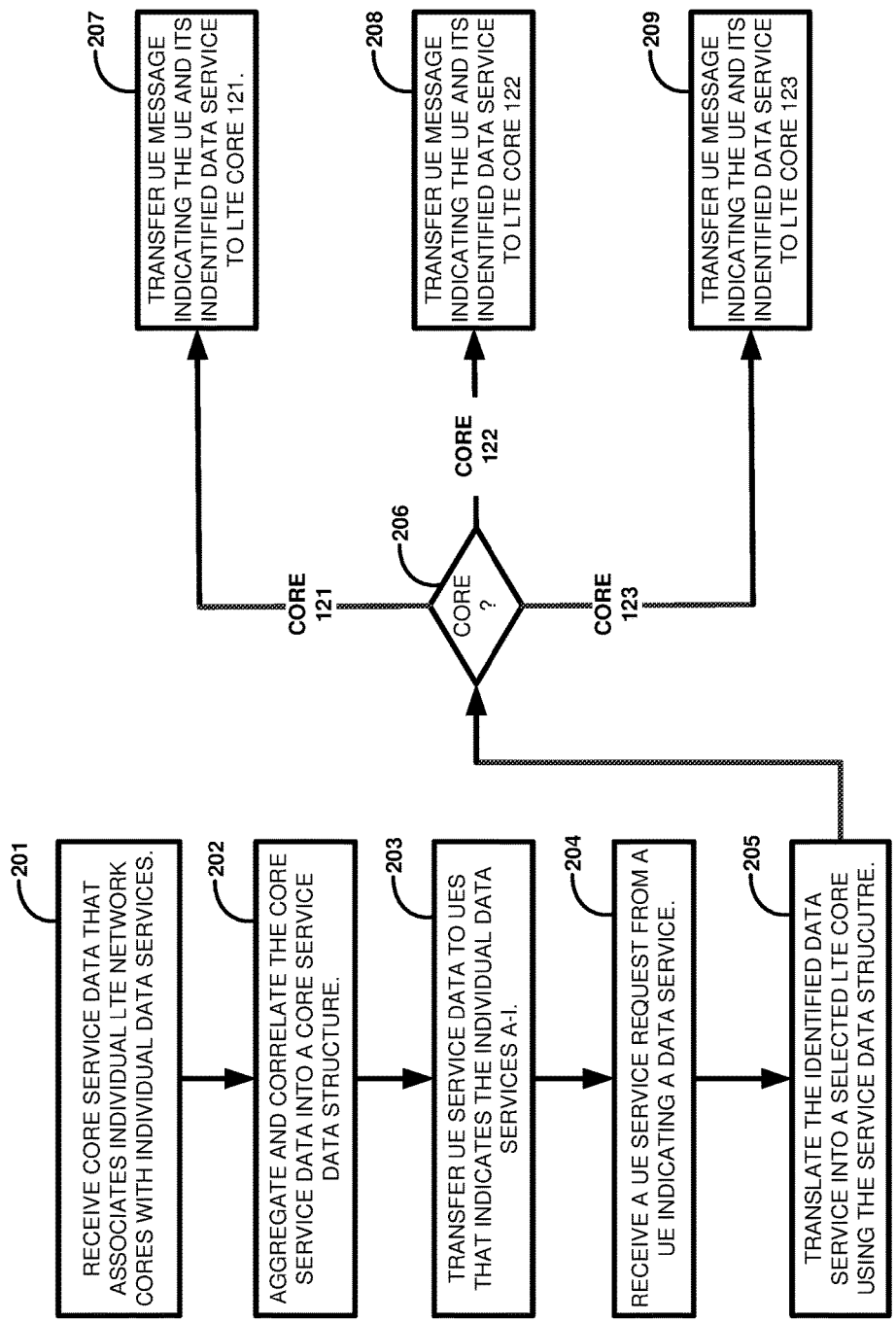
FIG. 2 illustrates the operation of a wireless base station to attach UEs to a distributed multi-core LTE network.

FIG. 2 illustrates the operation of wireless base station 110 to attach UEs to a distributed multi-core LTE network. Wireless base station 110 receives core service data that identifies individual data services for each core (201). Exemplary data services include: Internet access, voice/video calling, messaging services, eMBMS, location-based services, local bulletin, V2X, group communications, and enterprise access. Wireless base station 110 organizes the received data into a core service data structure that individually associates the LTE network cores with representative data services (201). Upon attachment or UE request, wireless base station 110 transfers UE service data to the UEs indicating the available data services that are indicated in the core services data structure (203).

Wireless base station 110 then receives a UE service request for a data service from a UE (204). If an RRC Connect message is used, the message will also include the standard Establishment Cause in addition to the SFI. Wireless base station 110 enters the core service data structure with the data service identified by the UE to yield one or more selected LTE network cores for the data service (205). If multiple cores are available, wireless base station 110 selects one of the cores based on factors like proximity, loading, quality, or UE ID. In response to the LTE core selection (206), wireless base station 110 transfers a UE message that indicates the UE and the data service to the selected LTE network core (207-209). If LTE network core 121 is selected (206), then network core 121 implements the identified data service responsive to the UE message from wireless base station 110 (207). If LTE network core 122 is selected (206), then network core 122 implements the identified data service responsive to the UE message from wireless base station 110 (208). If network core 123 is selected (206), then core 123 implements the identified data service responsive to the UE message from wireless base station 110 (209).

Figure 3:
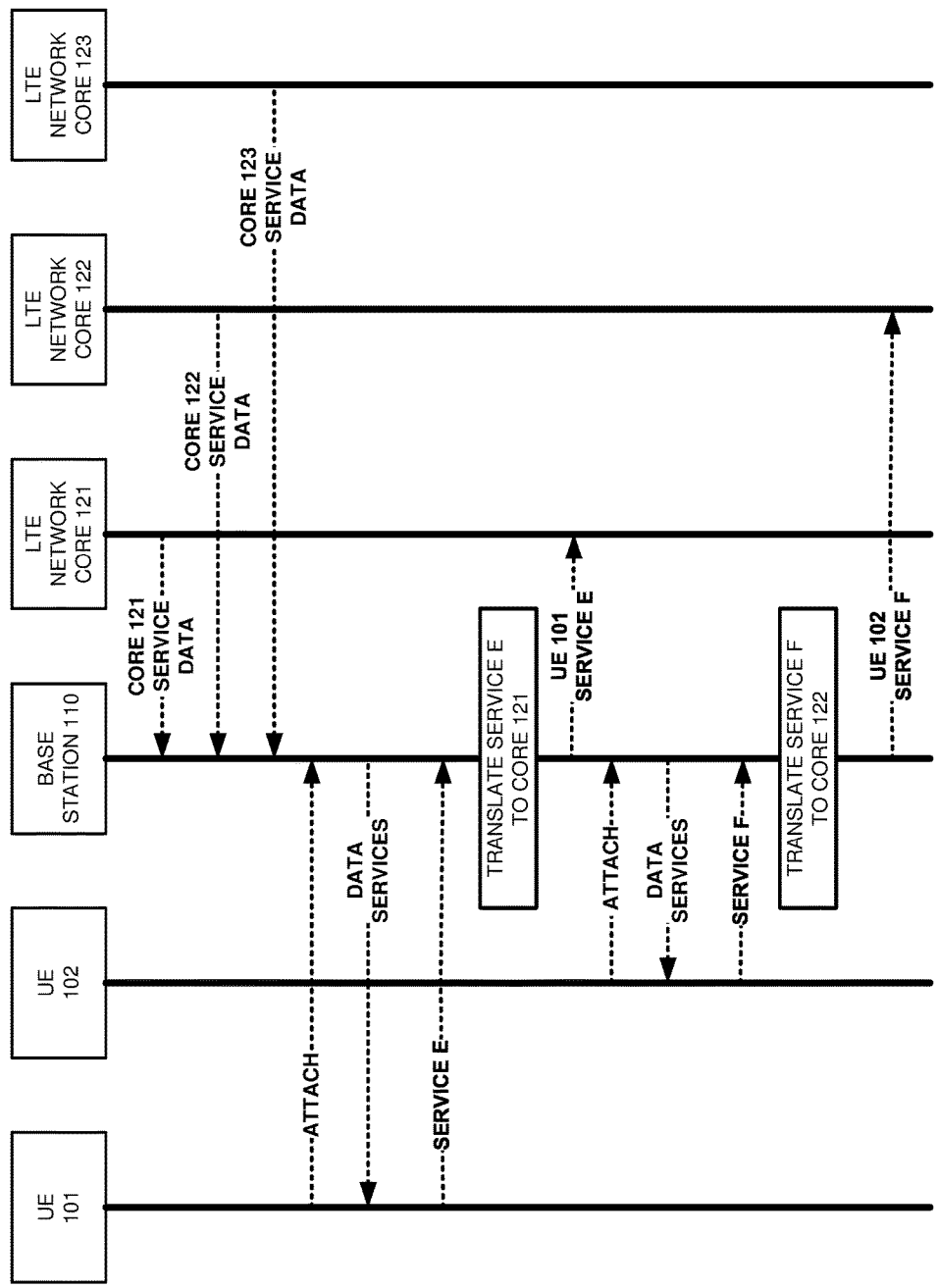
FIG. 3 illustrates the operation of data communication system to attach UEs to a distributed multi-core LTE network.

FIG. 3 illustrates the operation of data communication system 100 to attach UEs 101-102 to a distributed multi-core LTE network. LTE core networks 121-123 transfer core service data to wireless base station 110 to identify the individual data services for each core. The core service data may be organized into bit strings to efficiently identify the data services. The core service data may indicate core and/or MME class such as enterprise, V2X, full service, and the like. Wireless base station 110 aggregates and correlates the received data into a core service data structure that individually associates LTE network cores 121-123 with individual data services.

Upon attachment, wireless base station 110 transfers UE service data to UE 101 indicating the available data services. The transfer may use bit strings and occur over AS or NAS information blocks. For example, upon initial attachment to wireless base station 110 and a default core, wireless base station 110 may transfer a bit sequence comprising the UE service data for UE 101.

Wireless base station 110 subsequently receives a UE service request for data service E from UE 101. The UE service request may be an RRC message with the standard Establishment Cause in addition to an SFI that indicates the data service. The UE service request may have an indicator bit that identifies the presence of SFI in the request, and may also use a bit string to efficiently identify the requested data service.

In this example, UE 101 requests data service E. Wireless base station 110 enters core service data structure 111 with data service E and to yield LTE network core 121. In response to the core selection, wireless base station 110 transfers a UE message that indicates UE 101 and data service E to LTE network core 121. The UE message may be an S1-MME Initial UE message to an LTE MME in LTE network core 121. If UE 101 is subscribed to data service E, selected LTE network core 121 should have the appropriate UE 101 context for UE service authorization. If UE 101 is authorized for service E, LTE network core 121 provides data service E to UE 101 per the UE message from wireless base station 110.

After UE 102 attaches, wireless base station 110 transfers UE service data indicating the available data services. Wireless base station 110 receives a UE service request for data service F from UE 102. The UE service request may be an RRC message with an SFI that indicates the data service F. Wireless base station 110 enters core service data structure 111 with data service F which yields LTE network core 122. In response to the core selection, wireless base station 110 transfers a UE message that indicates UE 101 and data service F to LTE network core 122. If UE 102 is authorized for service F, LTE network core 122 provides data service F to UE 102 per the UE message from wireless base station 110.

Figure 4:
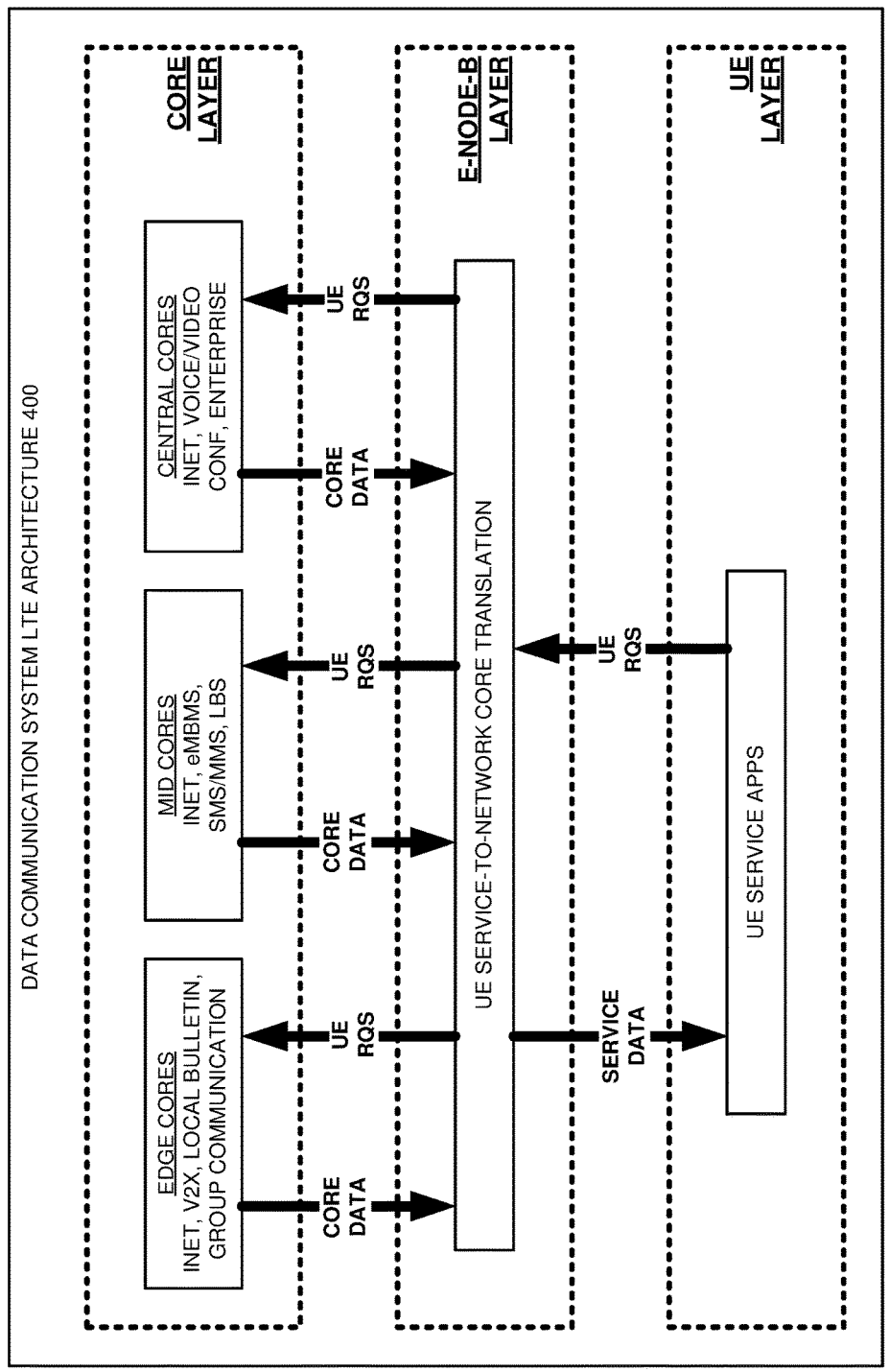
FIG. 4 illustrates a data communication system LTE architecture for a distributed multi-core LTE network.

FIG. 4 illustrates data communication system LTE architecture 400 for a distributed multi-core LTE network. LTE architecture 400 is an example of data communication system 100, although system 100 may use alternative configurations and operations. LTE architecture 400 comprises a UE layer, eNodeB layer, and a core layer. The UE layer comprises intelligent machines with communication transceivers like computers, phones, and media players. The eNodeB layer comprises wireless base stations with LTE capability. The core layer comprises network elements like gateways, servers, and controllers.

The core layer has edge cores, mid cores, and central cores. The edge cores are usually smaller and may be deployed along roads or in special purpose locations. The edge cores manage services like internet access (INET), V2X, local bulletin, and group communications. The mid cores are larger than edge cores and are typically near suburbs, campuses, and large enterprises. The mid cores manage services like INET, Short Messaging Service (SMS), Multimedia Messaging Service (MMS), evolved Multimedia Broadcast Multicast Service (eMBMS), Location-Based Services (LBS). The central cores are larger than mid cores and are typically in dense urban areas. The central cores manage all services including INET, voice/video conferencing, enterprise services, V2X, local bulletin, group communications, SMS/MMS, eMBMS, and LBS.

In operation, the core layer transfers core service data to the eNodeB layer. The core service data associates each LTE core with the individual data services that are served from that core. The eNodeB layer aggregates and correlates the core service data into a data structure that associates the specific data services with the individual network cores as indicated above. Upon UE attachment and/or UE request, the eNodeB layer transfers UE service data to the UE layer. The UE service data indicates the available data services like V2X, eMBMS, voice calling, and the like.

The UE service applications (APPS) in the UE layer transfer UE service requests to the eNodeB layer. For example, an eMBMS smartphone APP may direct the phone to transfer an eMBMS service request to the eNodeB layer. The service requests from the UE layer comprise RRC messages with standard Establishment Causes and also with the SFIs to indicate the requested data services.

The eNodeB layer enters its core service data structures with the requested data services to yield the available LTE network cores for the requested data services. The eNodeB layer selects network cores from those available and directs the UE service requests to the selected LTE network cores. Final network core selection is based on proximity, loading, and UE quality-of-service. The UE service requests from the eNodeB layer to the core layer are S1-MME Initial UE messages to MMEs in the selected LTE network cores. The MMEs direct the implementation of the requested data services responsive to the S1-MME Initial UE messages.

Many LTE network cores comprise NFVIs that execute NFV VNFs. These NFV VNFs comprise SDN applications and controllers. In turn, the SDN application VNFs comprise base-band units, base station controllers, MMEs, S-GWs, P-GWs, HSS, PCRF, V2X servers, eMBMS servers, group communication servers, local bulletin servers, enterprise servers, and the like. The available NFVIs, NFV NSDs, VNF Forwarding Graphs VNFFGs, and/or SDN applications may be individually associated with specific data services in the core services data structures at the eNodeB layer. Thus, the eNodeB layer may process a UE service request to select an available network core based on a specific VNGFG that is operating in the selected network core. The eNodeB layer may process the UE service request to select an available network core based on a specific SDN application VNF that is executing in the selected network core.

Figure 5:
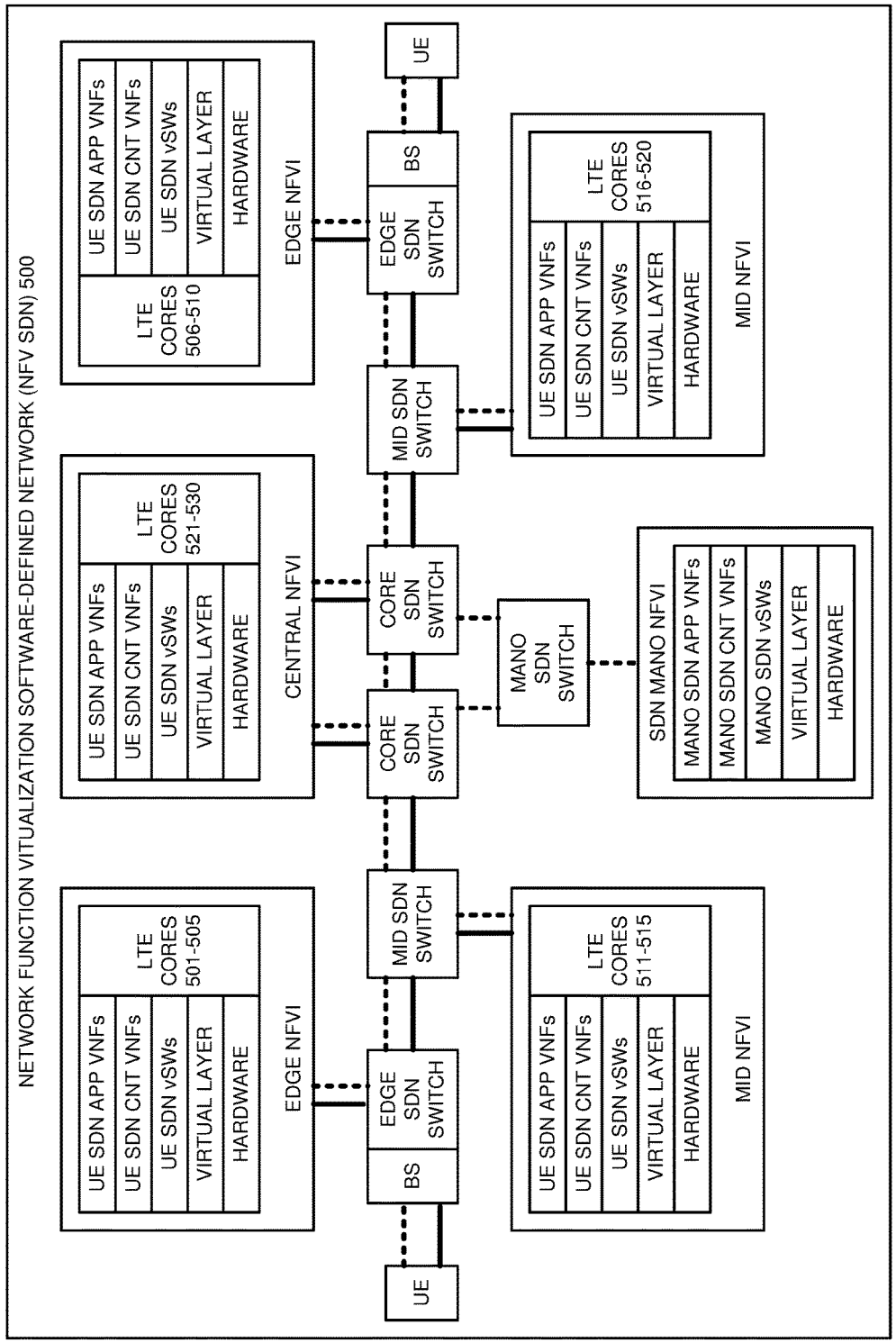
FIG. 5 illustrates a Network Function Virtualization (NFV) Software-Defined Network (SDN) for a distributed multi-core LTE network.

FIG. 5 illustrates Network Function Virtualization (NFV) Software-Defined Network (SDN) 500 for a distributed multi-core LTE network. NFV SDN 500 is an example of data communication system 100, although system 100 may use alternative configurations and operations. NFV SDN 500 comprises: User Equipment (UE), edge SDN switches with wireless Base Stations (BS), mid SDN switches, core SDN switches, a MANO SDN switch, edge NFVIs, mid NFVIs, a core NFVI, and an SDN MANO NFVI. The NFVIs comprise hardware such as CPU cores, flash memories, and I/O transceivers. The top-left edge NFVI hosts LTE cores 501-505, and the top-right edge NFVI hosts LTE cores 506-510. The left mid NFVI hosts LTE cores 511-515, and the right mid NFVI hosts LTE cores 516-520. The central NFVI hosts LTE cores 521-530.

The NFVIs execute virtual layer software to provide a virtualized processing environment. Under the control of the MANO system, the virtual layers execute various SDN VNFs. In the edge, mid, and core NFVIs, the virtual layers execute UE SDN virtual switch (vSW) VNFs, UE SDN controller (CNT) VNFs, and UE SDN application (APP) VNFs. In the MANO NFVI, the virtual layer executes MANO SDN vSW VNFs, MANO SDN CNT VNFs, MANO SDN APP VNFs. The MANO VNFs transfer networking data to the edge, mid, and core NFVI virtual layers to drive the execution of the UE SDN VNFs. The UE SDN APP VNFs in the edge NFVIs include a multitude of base station controller VNFs.

The UE SDN APP VNFs for LTE core networks 501-530 transfer core service data to the UE SDN APP base station controller VNFs in the edge NFVIs. The core service data identifies the individual data services for each LTE core, NFVI, NFV NS SD, VNFFG, and SDN APP VNF. UE SDN APP base station controller VNFs in the edge NFVIs aggregate and correlate the received data into core service data structures that individually associate LTE network cores 501-530 with individual data services and other NFV/SDN data.

Upon UE attachment, an SDN APP base station controller VNF transfers UE service data to the UE indicating the available data services at that base station. The SDN APP base station controller VNF receives a UE service request from the attached UE for one of the data services. In this example, the UE requests a video conferencing data service. The SDN APP base station controller VNF enters its core service data structure with a video conferencing service ID to yield LTE network cores 512-513, 517-518, and 531-532. The SDN APP base station controller VNF selects LTE network core 513 based on loading and proximity data for the video conferencing data service. In response to the LTE core 513 selection, the SDN APP base station controller VNF transfers a UE message that identifies the UE and the video conferencing data service to a UE SDN APP MME VNF in LTE network core 513. If the UE is authorized, the VNFs for LTE network core 513 serve the video conferencing data service to the UE according to the UE message from the base station controller VNF.

The UE SDN APP VNFs for LTE core 513 exchange signaling (typically with other cores) to establish the video conference between the UEs. Some of the UE SDN video conference APP VNFs transfer SDN controller API calls for the video conference to their associated UE SDN controller VNFs. The UE SDN controller VNFs transfer SDN data machine API calls to the SDN switches. The SDN switches and wireless base stations transfer the user video data between the UEs. If needed, an SDN video conference application VNF may direct an SDN controller VNF to drive an SDN data machine to deliver user video data to an NFVI for heavier processing like transcoding, decryption, or the like.

In another example, the SDN APP base station controller VNF receives a UE service request from the attached UE for a V2X data service. The SDN APP base station controller VNF enters its core service data structure with a V2X service ID to yield LTE network cores 504, 509, 514, 519, and 529-530. The SDN APP base station controller VNF selects LTE network core 504 based on its proximity (in the same NFVI) for the V2X data service. In response to the LTE core 504 selection, the SDN APP base station controller VNF transfers a UE message that identifies the UE and the V2X service to a UE SDN APP MME VNF in LTE network core 504. If the UE 101 is authorized, the UE SDN V2X APP VNF for LTE core 504 exchanges signaling (possibly with other cores) to establish the V2X service for the UE.

In particular, the UE SDN V2X APP VNF transfers SDN controller API calls for the V2X service to their associated UE SDN controller VNF. The UE SDN controller VNF transfers SDN data machine API calls to the edge SDN switch with the base station. The SDN switch and base station exchanges user V2X data with the UE. The UE SDN V2X APP VNF in LTE core 504 handles the V2X user data.

Figure 6:
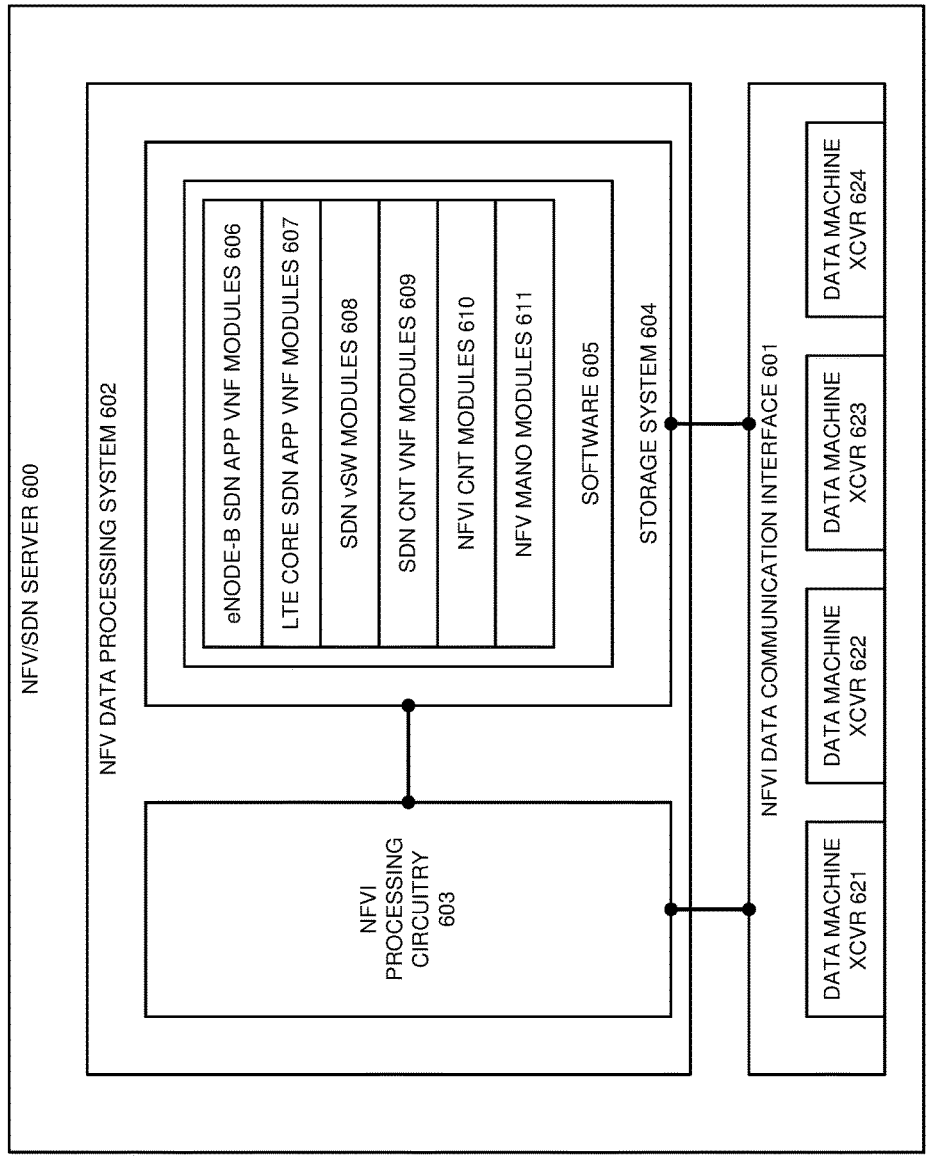
FIG. 6 illustrates an SDN server for a distributed multi-core LTE network.

FIG. 6 illustrates NFV/SDN server 600 for a distributed multi-core LTE network. NFV/SDN server 600 is an example of data communication system 100, although system 100 may use alternative configurations and operations. NFV/SDN server 600 comprises data communication interface 601 and data processing system 602. Data communication interface 601 comprises data machine transceivers 621-624. Data processing system 602 comprises processing circuitry 603 and storage system 604. Storage system 604 stores software 605. Software 605 includes respective software modules 606-611.

Data machine transceivers 621-624 comprise communication components, such as ports, bus interfaces, signal processors, memory, software, and the like. Processing circuitry 603 comprises server blades, circuit boards, bus interfaces, integrated circuitry, and associated electronics. Storage system 604 comprises non-transitory, machine-readable, data storage media, such as flash drives, disc drives, memory circuitry, servers, and the like. Software 605 comprises machine-readable instructions that control the operation of processing circuitry 603 when executed. Software 605 includes software modules 606-611. NFV/SDN server 600 may be centralized or distributed. All or portions of software 606-611 may be externally stored on one or more storage media, such as circuitry, discs, and the like. Some conventional aspects of SDN server 600 are omitted for clarity, such as power supplies, enclosures, and the like.

When executed by processing circuitry 603, software modules 606-611 direct circuitry 603 to perform the following operations. eNodeB SDN application VNF modules 606 drive base station operations including the correlation of core service data, transfer of service data to UEs, and translation of user-requested data services to LTE network cores. LTE core SDN application VNF modules 607 drive core network operations like mobility management and gateway security—including the transfer of core service data to eNodeB SDN application VNF modules 606. SDN vSW modules 608 provide SDN north and west interfaces to VNF modules 606-607. SDN vSW modules 608 provide SDN south and east interfaces to SDN CNT VNF modules 609. SDN CNT VNF modules 609 expose an SDN Application Programming Interface (API) to SDN modules 606-608 to control SDN data machines in the field. NFVI control modules 610 include hypervisors and virtual machines to create the virtualized networking environment. NFVI MANO modules 611 include orchestrators, VNF Managers (VNFMs) and Virtual Infrastructure Managers (VIMs) to control the operation of the NFVIs and VNFs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a distributed multi-core Long Term Evolution (LTE) data communication network to serve User Equipment (UE), the method comprising:
   a wireless base station receiving core service data that individually associates a Vehicle-to-X (V2X) service with a V2X LTE network core and that associates an evolved Multimedia Broadcast Multicast Service (eMBMS) with an eMBMS LTE network core;
   the wireless base station transferring UE service data that indicates the V2X service and the eMBMS to the UE;
   the wireless base station receiving, from the UE, a first Radio Resource Connect (RRC) message with a V2X Service Feature Indicator (SFI) and responsively selecting the V2X LTE network core and transferring a first UE message that indicates the UE to the V2X LTE network core;
   the V2X LTE network core serving the V2X service to the UE responsive to the first UE message from the wireless base station;
   the wireless base station receiving, from the UE, a second RRC message with a eMBMS SFI and responsively selecting the eMBMS LTE network core and transferring a second UE message that indicates the UE to the eMBMS LTE network core; and
   the eMBMS LTE network core serving the eMBMS to the UE responsive to the second UE message from the wireless base station.

2. The method of claim 1 wherein:
   the wireless base station comprises an evolved Node B (eNodeB); and
   the LTE network cores each comprise a Mobility Management Entity (MME).

3. The method of claim 1 further comprising:
   the wireless base station receiving additional core service data that individually associates a Group Communication Service with a Group Communication Service LTE network core;

the wireless base station transferring additional UE service data that indicates the Group Communication Service to the UE;

the wireless base station receiving, from the UE, a third RRC message with a Group Communication Service SFI and responsively selecting the Group Communication Service LTE network core and transferring a third UE message that indicates the UE to the Group Communication Service LTE network core; and the Group Communication Service LTE network core serving the Group Communication Service to the UE responsive to the third UE message from the wireless base station.

4. The method of claim 1 further comprising:

the wireless base station receiving additional core service data that individually associates a Local Bulletin Service with a Local Bulletin Service LTE network core;

the wireless base station transferring additional UE service data that indicates the Local Bulletin Service to the UE;

the wireless base station receiving, from the UE, a third RRC message with a Local Bulletin Service SFI and responsively selecting the Local Bulletin Service LTE network core and transferring a third UE message that indicates the UE to the Local Bulletin Service LTE network core; and the Local Bulletin Service LTE network core serving the Local Bulletin Service to the UE responsive to the third UE message from the wireless base station.

5. The method of claim 1 wherein at least some of the multiple LTE network cores comprise Software-Defined Network (SDN) applications.

6. The method of claim 1 wherein at least some of the multiple LTE network cores comprise Network Function Virtualization (NFV) Virtual Network Functions (VNFs).

7. The method of claim 1 wherein at least some of the multiple LTE network cores comprise Network Function Virtualization Infrastructures (NFVIs).

8. A distributed multi-core Long Term Evolution (LTE) data communication network to serve User Equipment (UE), the distributed multi-core LTE network comprising:

a Vehicle-to-X (V2X) LTE network core configured to serve a V2X service to the UE;

an evolved Multimedia Broadcast Multicast Service (eMBMS) LTE network core configured to serve an eMBMS to the UE;

a wireless base station configured to receive core service data that individually associates the V2X service with the V2X LTE network core and that individually associates the eMBMS with the eMBMS LTE network core and to transfer UE service data that indicates the V2X service and the eMBMS to the UE;

the wireless base station configured to receive, from the UE, a first Radio Resource Connect (RRC) message with a V2X Service Feature Indicator (SFI) and responsively select V2X LTE network core and transfer a first UE message that indicates the UE to the V2X LTE network core; and the wireless base station configured to receive, from the UE, a second RRC message with a eMBMS SFI and responsively select the eMBMS LTE network core and transfer a second UE message that indicates the UE to the eMBMS LTE network core.

9. The distributed multi-core LTE network of claim 8 wherein:

the wireless base station comprises an evolved Node B (eNodeB); and the LTE network cores each comprise a Mobility Management Entity (MME).

10. The distributed multi-core LTE network of claim 8 wherein:

the wireless base station is configured to receive additional core service data that individually associates a Group Communication Service with a Group Communication Service LTE network core;

the wireless base station is configured to transfer additional UE service data that indicates the Group Communication Service to the UE;

the wireless base station is configured to receive, from the UE, a third RRC message with a Local Bulletin Service SFI and responsively select the Group Communication Service LTE network core and transfer a third UE message that indicates the UE to the Group Communication Service LTE network core; and the Group Communication Service LTE network core is configured to serve the Group Communication Service to the UE responsive to the third UE message from the wireless base station.

11. The distributed multi-core LTE network of claim 8 wherein:

the wireless base station is configured to receive additional core service data that individually associates a Local Bulletin Service with a Local Bulletin Service LTE network core;

the wireless base station is configured to transfer additional UE service data that indicates the Local Bulletin Service to the UE;

the wireless base station is configured to receive, from the UE, a third RRC message with a Local Bulletin Service SFI and responsively select the Local Bulletin Service LTE network core and transfer a third UE message that indicates the UE to the Local Bulletin Service LTE network core; and the Local Bulletin Service LTE network core is configured to serve the Local Bulletin Service to the UE responsive to the third UE message from the wireless base station.

12. The distributed multi-core LTE network of claim 8 wherein at least some of the multiple LTE network cores comprise Software-Defined Network (SDN) applications.

13. The distributed multi-core LTE network of claim 8 wherein at least some of the multiple LTE network cores comprise Network Function Virtualization (NFV) Virtual Network Functions (VNFs).

14. The distributed multi-core LTE network of claim 8 wherein at least some of the multiple LTE network cores comprise Network Function Virtualization Infrastructures (NFVIs).

* * * * *